Patented July 8, 1930

1,769,938

UNITED STATES PATENT OFFICE

RAYMOND C. BENNER, OF BAYSIDE, AND ARTHUR H. HENNINGER, OF FLUSHING, NEW YORK, ASSIGNORS TO GENERAL CHEMICAL COMPANY, OF NEW YORK, N. Y., A CORPORATION OF NEW YORK

PRODUCTION OF AMMONIUM SULPHATES

No Drawing.   Application filed June 30, 1926.   Serial No. 119,738.

This invention relates to a process for the manufacture of ammonium sulphate and more particularly to a process for the manufacture of ammonium sulphate from ammonia and sulfur dioxide.

When sulfur dioxide or gases containing sulfur dioxide are passed into an aqueous solution of ammonia, ammonium sulfite, $(NH_4)_2SO_3$, and ammonium bisulfite, $NH_4HSO_3$, result. It has been known heretofore that this solution, comprising ammonium sulfite and ammonium bisulfite may be converted to some extent into ammonium sulphate by heating under comparatively low pressure at a temperature of about 150° C. The reaction, however, is incomplete and not sufficiently rapid to permit commercial application. Furthermore, it has been considered impossible heretofore to alter the conditions of conversion of the sulfite and bisulfite to provide for complete reaction at such rates as would permit the commercial application of the process. This conclusion may have been reached due to the general view that the reaction takes place with great violence, probably amounting even to explosive force.

We have discovered that solutions containing ammonium bisulfite and ammonium sulfite may be completely and rapidly converted to ammonium sulphate, when such conversion is carried out under much higher pressure and at a considerably higher temperature than has heretofore been used.

In carrying out our novel process, a liquor comprising ammonium sulfite and ammonium bisulfite is prepared by the absorption of sulfur dioxide in an ammoniacal solution, as, for example, aqueous ammonia. The liquor thus prepared will contain small amounts of sulphate due to oxidation by the air. The ratio of the ammonium bisulfite to ammonium sulfite is preferably regulated by the addition of sulfur dioxide or ammonia so that there is at least two mols of ammonium bisulfite to one mol of ammonium sulfite. It is highly desirable that there should be slightly more of the bisulfite compound present than is required in the above ratio in order that the ammonium sulphate solution produced shall contain some ammonium bisulfate. This ammonium bisulfate, upon evaporation of the solution to recover the ammonium sulphate, decomposes the salts of the volatile acids which may be present and the acids are vaporized, thus purifying the ammonium sulphate with little extra expense and making it possible to use a very cheap source of ammonia. The acid which is generally present in largest amounts as an impurity in cheap ammonia, as that produced from gas house liquor, is carbonic acid, and this will be readily eliminated by the presence of a small amount of bisulfate. When it is desired to separate the sulfur produced by the oxidation process by cooling the mixture below the melting point of sulfur, and then filtering, the solution of ammonium sulfite and ammonium bisulfite should contain approximately 25% by weight of sulfur in the form of these compounds. This concentration, after oxidation, yields a solution of ammonium sulphate which is highly concentrated but not quite saturated when slightly below the melting point of sulfur. This allows the sulfur produced in the reaction to be filtered off from the solution containing ammonium sulphate without trouble arising from crystallization of the ammonium sulphate. After the sulfur is removed by filtration, the solution of ammonium sulphate, after further reduction in temperature, will be of a suitable density for crystallization, without further concentration. However, much more concentrated solutions may be used so that the ammonium sulphate resulting from the oxidation is admixed with water in the form of a slush rather than a solution. In this case the sulfur is separated while liquid by means of a suitable sulfur trap.

The solution thus prepared is oxidized by continuously passing it through suitable pipes, as for example enamel lined iron pipes, under a pressure of 700–1000 lbs. per sq. in. and at a temperature of 200–350° C. The conversion of the ammonium bisulfite and ammonium sulfite into ammonium sulphate may be defined by the equation

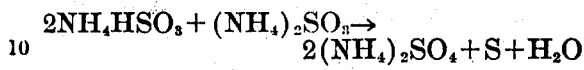

With a slight excess of bisulfite, ammonium bisulfate is formed

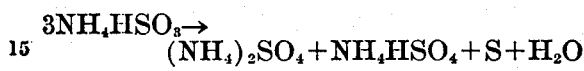

The sulfur formed is removed in the liquid state by means of a sulfur trap in the pressure system or it may be permitted to solidify and settle out upon cooling the ammonium sulphate liquor.

The ammonium sulphate liquor, free from sulfur but containing small amounts of ammonium bisulfate, and any unoxidized sulfite and bisulfite, is evaporated and the salt crystallized out, for example by allowing it to flow onto a bed of ammonium sulphate in a rotary calciner (dryer) where the water and any trace of ammonium sulfite and the volatile acids are vaporized. The presence of a small amount of bisulfite in the oxidized product is very advantageous as the ammonia vapor resulting from the decomposition thereof serves to neutralize any ammonium bisulfate thereby yielding a neutral product. The sulfur dioxide volatilized in the evaporating process may be returned to the absorption system and recovered.

By carrying out the process for the oxidation of ammonium bisulfite and ammonium sulfite to ammonium sulphate under the conditions above specified, namely at a temperature above 200° C., and ordinarily at about 250° C., and under high pressures, we are able to cause substantially complete reaction at rates which permit the commercial application of the process. And also by the proper regulation of the composition and concentration of the solution comprising the ammonium bisulfite and ammonium sulfite, a very pure ammonium sulphate may be directly and efficiently obtained upon evaporation of the oxidized solution.

We claim:

1. The process of producing ammonium sulphate which comprises heating a solution containing ammonium sulfite and ammonium bisulfite at a temperature above 200° C. and under a pressure of at least 700 lbs. per sq. in.

2. A process for producing ammonium sulphate which comprises absorbing $SO_2$ in an ammoniacal solution and heating the resulting solution at a temperature above 200° C. and under a pressure of at least 700 lbs. per sq. in.

3. The process of producing ammonium sulphate which comprises preparing a solution of ammonium bisulfite and ammonium sulfite, regulating the composition of the solution so that there is at least two mols of ammonium bisulfite to one mol of ammonium sulfite, and heating such solution to a temperate about 200° C. and under a pressure of at least 700 lbs. per sq. in.

4. The process of producing ammonium sulphate which consists in preparing a solution containing approximately 25% by weight of sulfur in the form of ammonium bisulfite and ammonium sulfite, the ratio of these constituents being at least two mols of ammonium bisulfite to one mol of ammonium sulfite, and heating said solution at a temperature of approximately 250° C. and under pressure.

5. The process of producing ammonium sulphate which consists in preparing a solution containing ammonium bisulfite and ammonium sulfite, regulating the composition of the solution so that there is more than two mols of ammonium bisulfite to one mol of ammonium sulfite and heating such solution to a temperature of approximately 250° C. and under pressure.

6. A process for producing ammonium sulphate which comprises absorbing sulfur dioxide in an ammoniacal solution, heating the resulting solution at a temperature above 200° C. and under pressure, separating the sulfur, calcining the oxidized product in the presence of a small amount of unoxidized sulfite and returning the volatilized surfur dioxide for the preparation of more unoxidized solution.

7. The step in the production of crystallized ammonium sulphate which comprises evaporating a liquor containing ammonium sulphate and a small amount of ammonium bisulfate in the presence of a small amount of ammonium bisulfite.

8. The process for producing ammonium sulphate which comprises absorbing sulfur dioxide in an ammoniacal solution, heating the resulting solution under pressure to form ammonium sulphate and a small amount of ammonium bisulphate, separating the sulfur formed in the reaction, evaporating the remaining liquor in the presence of a small amount of ammonium bisulfite whereby sulfur dioxide is volatilized, and returning the volatilized sulfur dioxide for the preparation of more unoxidized solution.

In testimony whereof, we affix our signatures.

RAYMOND C. BENNER.
ARTHUR H. HENNINGER.

CERTIFICATE OF CORRECTION.

Patent No. 1,769,938.             Granted July 8, 1930, to

RAYMOND C. BENNER ET AL.

It is hereby certified that error appears in the printed specification of the above numbered patent requiring correction as follows: Page 2, lines 72 and 73, claim 2, for the words "temperate about" read temperature above; and that the said Letters Patent should be read with this correction therein that the same may conform to the record of the case in the Patent Office.

Signed and sealed this 26th day of August, A. D. 1930.

(Seal)                                M. J. Moore,
                                       Acting Commissioner of Patents.